(12) United States Patent
Shamma et al.

(10) Patent No.: US 10,887,514 B2
(45) Date of Patent: Jan. 5, 2021

(54) SYSTEM AND METHOD OF PROVIDING GAZE AND AWARENESS FOR ULTRA WIDE AND 360 CAMERAS

(71) Applicant: FUJI XEROX CO., LTD., Tokyo (JP)

(72) Inventors: David Ayman Shamma, San Francisco, CA (US); Laurent Denoue, Veneto (IT); Yulius Tjahjadi, San Mateo, CA (US); Anthony Dunnigan, Palo Alto, CA (US); John J. Doherty, San Francisco, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/230,669

(22) Filed: Dec. 21, 2018

(65) Prior Publication Data
US 2020/0204731 A1    Jun. 25, 2020

(51) Int. Cl.
| | |
|---|---|
| *H04N 7/15* | (2006.01) |
| *H04N 7/14* | (2006.01) |
| *H04N 5/232* | (2006.01) |
| *G06T 7/11* | (2017.01) |
| *G06T 3/40* | (2006.01) |
| *G01B 11/24* | (2006.01) |
| *H04N 5/225* | (2006.01) |

(52) U.S. Cl.
CPC ......... *H04N 5/23238* (2013.01); *G01B 11/24* (2013.01); *G06T 3/40* (2013.01); *G06T 7/11* (2017.01); *H04N 5/2256* (2013.01); *H04N 7/142* (2013.01); *H04N 7/147* (2013.01); *H04N 7/15* (2013.01); *H04N 7/152* (2013.01)

(58) Field of Classification Search
CPC ............. H04N 5/23238; H04N 5/2256; H04N 7/14–157; G06T 7/11; G06T 3/40; G01B 11/24; G06F 1/1686; G02B 13/001–009
See application file for complete search history.

(56) References Cited

U.S. PATENT DOCUMENTS

| | | | | |
|---|---|---|---|---|
| 4,995,071 A | * | 2/1991 | Weber | H04N 7/15 348/14.08 |
| 5,443,076 A | * | 8/1995 | Bau | A61B 5/04842 348/E7.082 |
| 6,836,286 B1 | * | 12/2004 | Tachi | H04N 7/15 348/36 |
| 10,009,568 B1 | * | 6/2018 | Ellis | G06F 3/147 |
| 10,148,912 B1 | * | 12/2018 | Oliver | H04N 7/142 |

(Continued)

OTHER PUBLICATIONS

Shamma, D. A., et al., Interacting with Smart Consumer Cameras: Exploring Gesture, Voice, and AI Control of Video Streaming, FXPAL Technical Report, FXPAL-TR-18-001, Apr. 1, 2018, 13 pgs.

(Continued)

*Primary Examiner* — Abdelaaziz Tissire
(74) *Attorney, Agent, or Firm* — Procopio, Cory, Hargreaves & Savitch LLP (57) ABSTRACT

An apparatus includes a 360 camera configured to image a volume including one or more local users, and generate an output for remote users, and an illumination device configured to generate a visual output for the one or more local users that is indicative of a viewing direction or a number of the remote users, based on a mapping of a region of interest of the remote viewers. The illumination device is associated with the 360 camera.

20 Claims, 9 Drawing Sheets
(6 of 9 Drawing Sheet(s) Filed in Color)

(56) References Cited

U.S. PATENT DOCUMENTS

| | | | | |
|---|---|---|---|---|
| 2005/0093970 | A1* | 5/2005 | Abe | H04N 7/15 |
| | | | | 348/14.05 |
| 2013/0342638 | A1* | 12/2013 | Sobti | H04N 7/15 |
| | | | | 348/14.08 |
| 2013/0344917 | A1* | 12/2013 | Sobti | H04M 1/0254 |
| | | | | 455/557 |
| 2014/0136203 | A1* | 5/2014 | Liu | H04R 29/002 |
| | | | | 704/246 |
| 2015/0195489 | A1* | 7/2015 | Sobti | H04N 7/142 |
| | | | | 348/14.08 |

OTHER PUBLICATIONS

Cutler, R., et al., Distributed Meetings: A Meeting Capture and Broadcasting System, Multimedia '02, Dec. 1-6, 2002, Juan-les-Pins, France, pp. 503-512.

Amazon.com, Amazon Cloud Cam Security Camera, 9 pgs, [online] URL: https://www.amazon.com/Introducing-Amazon-Cloud-Cam/dp/B01C4UY0JK.

Lighthouse AI, Inc., AI, 2018, 3 pgs, [online] URL: https://www.light.house/.

Jibo.com, Meet Jibo, 2018, 11 pgs. [online] URL: https://www.jibo.com/.

Chambel, T., et al., Towards Immersive Interactive Video Through 360 Hypervideo, ACE'2011, Libon, Portugal, 2 pgs.

Mok, T., et al., Critiquing Physical Prototypes for a Remote Audience, DIS 2017, Jun. 10-14, 2017, Edinburgh, UK, 13 pgs.

\* cited by examiner

SYSTEM AND METHOD OF PROVIDING GAZE AND AWARENESS FOR ULTRA WIDE AND 360 CAMERAS

BACKGROUND

Field

Aspects of the example implementations relate to methods, systems, and interfaces for providing gaze and awareness for ultrawide and 360 cameras, and more specifically, apparatuses, and methods for adding gaze and awareness to ultralight and 360 cameras by use of light sources.

Related Art

In the related art, cameras may be used in rooms. More specifically, a camera (e.g., video camera) may be provided in a room for one or more functions, such as security, monitoring, interactive communication across remote physical location, etc. There is a related art 360° camera, which may be used to image an entire room, such as a meeting room, office room, home, or other venue space. In contrast with related art "Pan Tilt Zoom" cameras, the related art 360° cameras do not require mechanical movement structures, such as servos or related motors, for operation, and can be easily placed at any location to provide visibility in all directions at all times.

In accordance with related art connectivity capabilities, the related art 360° camera may provide a mechanism for remote conferencing between users who are not located in the same room, or for automatic visual assistance in certain circumstances, such as in a house.

However, the related art 360° camera has various problems and disadvantages. For example, but not by way of limitation, although the related 360° camera provides full gaze/awareness of the room with respect to the remote viewers or the AI agents that are remotely observing the users in the room, the local users in the room are themselves not aware of the direction or number of viewers who are remote and are viewing.

In one related art example, one or more remote peers may be remotely viewing, by way of the 360 camera, one or more local users in the room. However, the one or more local users do not have any mechanism for knowing, by looking at the 360 camera, whether any of the remote peers are viewing those particular users, or even which general direction, angle, field of view, etc. in which the remote peer is focused in the 360 camera.

Moreover, automatic capture tools such as AI agents or other visual assistants, may be viewing one or more users located in the room with the 360 camera. However, the one or more users do not have any mechanism for determining whether they are being viewed, and how many automatic capture tools are observing them. This related art problem is due to the fact that the related art 360 camera does not include any visual indicator for the local user to determine a direction, identity or numerosity of remote viewers.

Accordingly, there is an unmet need in the related art to provide a system and method for a user in a room having a 360 camera to be able to preserve privacy without hindering collaboration, by permitting the user in the room to be able to ascertain information about the remote viewer or viewers without substantially interfering with the collaboration.

SUMMARY

According to aspects of the example implementations, an apparatus includes a 360 camera configured to image a volume including one or more local users, and generate an output for remote users, and an illumination device configured to generate a visual output for the one or more local users that is indicative of a viewing direction or a number of the remote users, based on a mapping of a region of interest of the remote viewers, wherein the illumination device is associated with the 360 camera.

According to another aspect, the remote users comprise at least one of automated agents and persons.

According to still another aspect, the mapping of the region of interest of the remote viewers comprises, for each of the remote users, yaw, pitch and field of view values that are mapped to the illumination device.

According to yet another aspect, the illumination device comprises a stack of visual indicator lights. Still further, the stack of visual indicator lights is embedded in a crown that is configured to receive the 360 camera.

According to another aspect, the visual output comprises at least one of a size, color and intensity of the illumination device that is indicative of the viewing direction or the number of the remote users, or of one or more of the remote users joining, leaving, speaking and synchronizing to a viewport determining by the one or more local users.

According to an additional aspect, a motion of the remote users is represented by a motion and a brightness of the illumination device around the 360 camera that corresponds to the motion. Also, the motion of the remote user comprises one or more of pan, tilt and zoom.

A method is also provided, the method including receiving an input from a 360 camera, wherein the input is associated with information received via the 360 camera of a local environment; generating a stream is generated for each of plural remote users that each interact with the 360 camera via a device; based on the stream and information from the device of the remote user for each of the remote users, determining region of interest information; mapping the determined region of interest information to the particular light structure of a specific lighting configuration associated with the 360 camera; generating a command and providing the command to the lighting; and based on the command, generating a light output indicative of the region of interest information associated with the remote users, such that a local user at or near the 360 camera may view the light output.

Further, a non-transitory computer readable medium including a processor configured to execute instructions stored in a storage is provided, the instructions comprising generating a stream is generated for each of plural remote users that each interact, via a device, with a 360 camera that provides information associated with a local environment; based on the stream and information from the device of the remote user for each of the remote users, determining region of interest information; mapping the determined region of interest information to the particular light structure of a specific lighting configuration associated with the 360 camera; and generating a command to output a light display indicative of the region of interest information associated with the remote users, such that a local user at or near the 360 camera may view the light output.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. For example, but not by way of limitation, the term "360 camera" as used herein may refer to a camera, such as a 360° camera or an ultra-wide camera, which does not require any mechanical motor or other movement structure, and can be positioned in a room to detect activity in all directions at all times.

For example, but not by way of limitation, the example implementations may include a camera with a visual field of the entire sphere, or a camera with the ability to capture a 360-degree field of view in the horizontal plane. Further, the term "360 camera" may include, but is not limited to, an ultra-wide camera, e.g., having a lens with a focal length shorter than the short side of film or sensor. However, "360 camera" does not include pan/tilt/zoom cameras.

In the present example implementation, the camera may be capturing video, still image, or both for a plurality of remote users having a viewing device that permits the remote users to adjust their region of interest within the 360 camera. The viewing device may provide parameter information associated with the region of interest to a processor that provides mapping between the parameter information and a lighting scheme associated with the 360 camera. Based on the mapping, the lighting scheme is controlled so as to provide the local users with indications related to the region of interest of the remote users, without interfering with the activity in the room of the 360 camera.

Aspects of the example implementations are directed to use of 360 cameras. As explained above, 360 cameras may be used in various scenarios, including but not limited to teleconferencing, security, surveillance, assistants, or other scenarios as would be understood by those skilled in the art. In these and other scenarios, the 360 cameras may be used because they can provide a view of an entire volume of the room, and do not generate movement or additional noise due to mechanical motors that are typically associated with camera that must pan, zoom or tilt. The 360 cameras can be placed, for example, on the ceiling of a meeting room, and the video feed of the 360 camera may be provided to a remote participant.

The remote participant may be another user, or an automated system that may, for example, sense, receive and store the output of the 360 camera with respect to a meeting, or other activity, such as detecting activity performed by a user in a location such as a home, factory, or other venue. The 360 camera may also be incorporated into a smaller meeting space, and optionally, the 360 camera may be mobile, such as being positioned on a meeting table in a room, to include remote participants in meetings.

As explained above, related art 360 cameras may create privacy and/or awareness issues for the users that are being sensed by the 360 cameras, because those users are not able to determine remote user focus for the 360 camera (much less an identity of the remote user), because the 360 camera is capable of receiving input from everywhere in the room at any time, without giving an indication of the direction from which the input is being received by the remote user. As a related, the lack of gaze and awareness associated with the 360 camera may have negative impacts on collaboration, because the participants local to the 360 camera cannot determine where the remote user is looking.

Aspects of the example implementations are directed to at least the foregoing related art issues. More specifically, the example implementations provide a visual indicator near or on the 360 camera, so that the local user at the 360 camera may be provided with an indication of gaze and awareness of a direction in which the remote users are sensing input, or looking, as well as a number of remote users that are remotely observing the local users by way of the 360 camera.

That is, according to the example implementations, a 360 camera may include one or more illumination sources to provide an indication of remote users, the remote users being real persons using remote viewing devices, or automatic systems. Further, for each of the remote users, a viewport may be provided such that the actual yaw, pitch, and field of view values of the users may be mapped to the light sources that are available in the hardware associated with the 360 camera.

The light source may be, for example, a stack of one or more visual indicator lights, including but not limited to LED rings, optionally provided inside a base, may be provided to produce a visually appealing output for the user that does not interfere with the 360 camera. Further, a color and an intensity of light source may be used to indicate a number and a type of remote user.

Additionally, motion, such as pan/tilt/zoom, of remote agents may be represented by motion and brightness of the lights associated with the 360 camera, to indicate corresponding actions such as panning, tilting or zooming. Also, visual and/or audio indicators may be provided to local users at the 360 camera to indicate specific people joining, leaving, speaking and synchronizing, such as to a specific viewport.

Figure 1A:
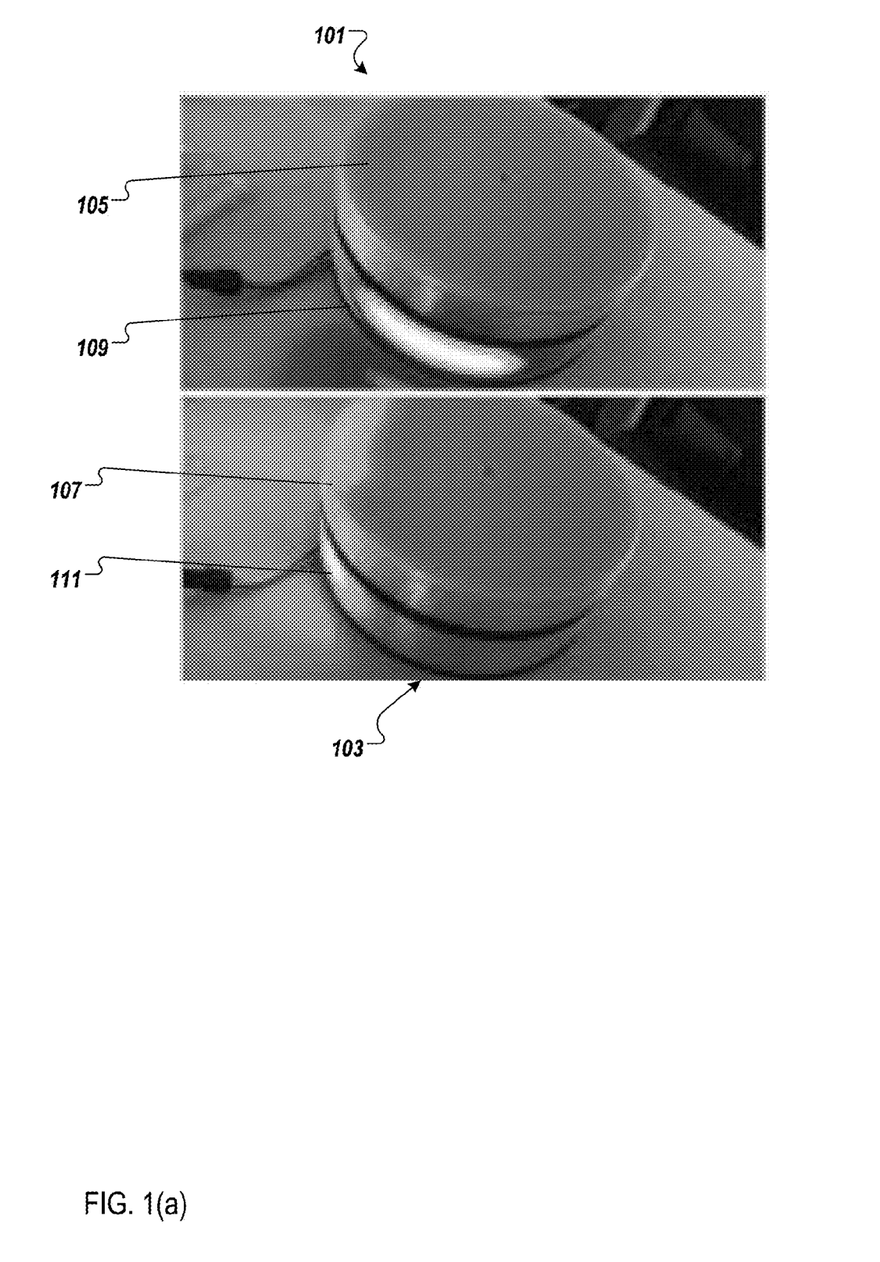
FIGS. 1(a)-(c) illustrate examples of 360 cameras, according to the example implementations.

FIG. 1(a) illustrates a 360 camera according to an example implementation. For example, but not by way of limitation, this example implementation 100 provides an illustration of a crown (e.g., base) onto which a 360 camera may be affixed (e.g., bolted or adhered). More specifically, one or more rings of visual indicators, such as light emitting diodes (LEDs), may be provided. At 101, an upper portion 105 is provided, onto which a 360 camera may be affixed.

Further, a lower portion 109 of the visual indicator lights is illuminated in a color, in this case blue. At 103, the upper portion 107 of outer visual indicator lights is illuminated in another color, in this case green. Further, the lower portion 111 may or may not be eliminated at the same time as the upper portion 109, in this case green as well, but optionally another color. It should be noted that various visual attributes of the visual indicator lights may be used to distinguish a visible light output.

For example, but not by way of limitation, the width or thickness of the portion of the visual indicator lights that is illuminated may be indicative of a type of remote user, a duration of remote viewing, a relationship between the remote user and the user in the room, a type of the remote user, such as human or automatic, or a number of remote users looking in a given direction.

Other attributes of the visible light output may be used in substitution or in combination with the foregoing attributes, including but not limited to brightness, pulse duration, or other attributes of the visual indicator lights (e.g., but not limited to, LED ring). Accordingly, a user in the room with the 360 camera may be able to determine a number of remote users, as well as where those remote users are looking in the room that includes the 360 camera.

Figure 1B:
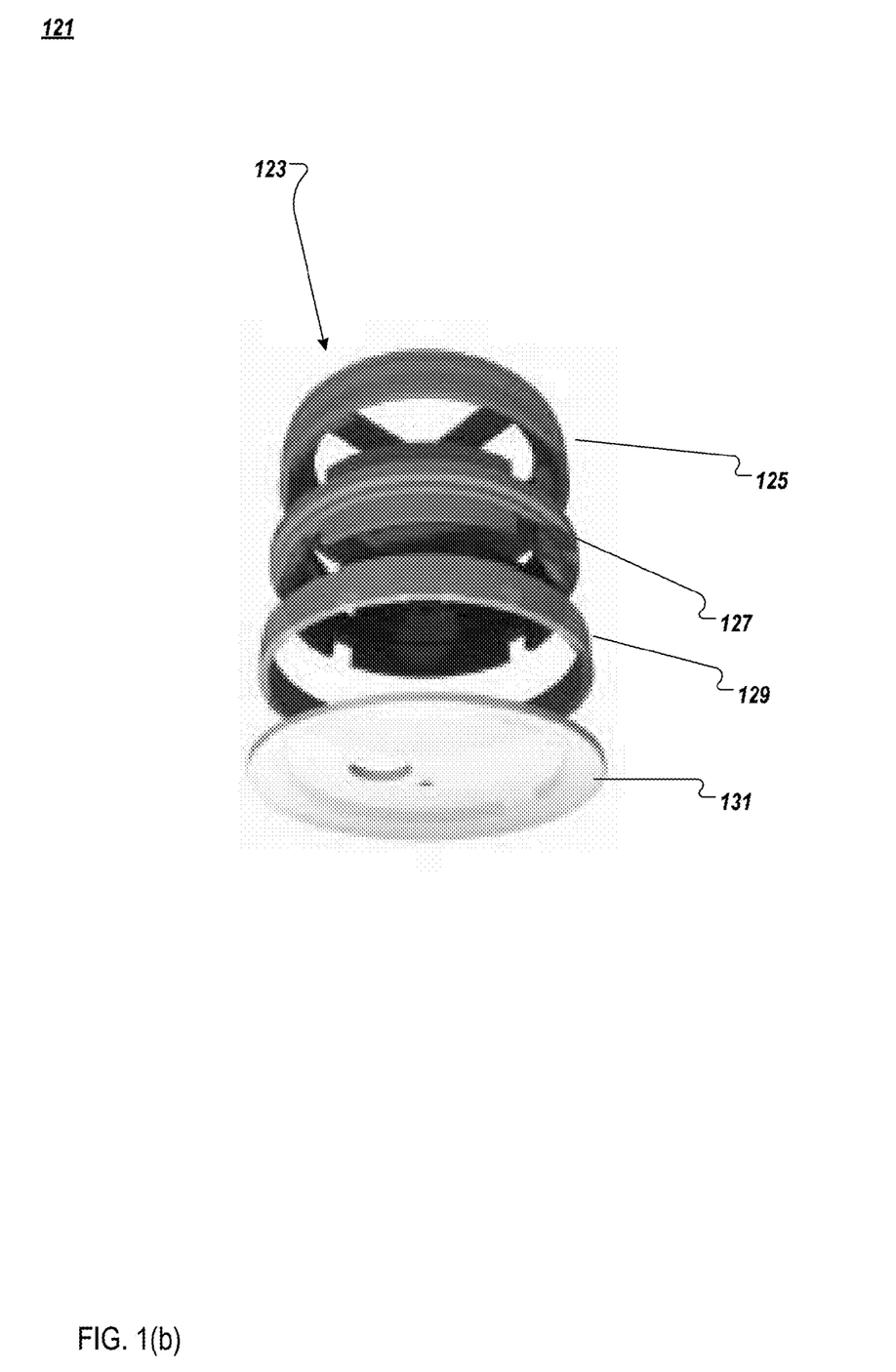

FIG. 1(b) illustrates a model of an example crown associated with the example implementation. For example, as shown in 121, the crown 123 includes bands 125, 129 that are configured to transmit a visible output of the visual indicator lights placed therein. An intermediate layer 127 is provided as a separation between upper visual indicator lights (such as an upper LED ring) and lower visual indicator lights (such as a lower LED ring). Additionally, a base 131 is provided at an end of the crown 123. Accordingly, a 360 camera may be positioned on the base 131, or on the end of the band 125, depending on whether the 360 camera is positioned on a ceiling, table or other location.

Figure 1C:
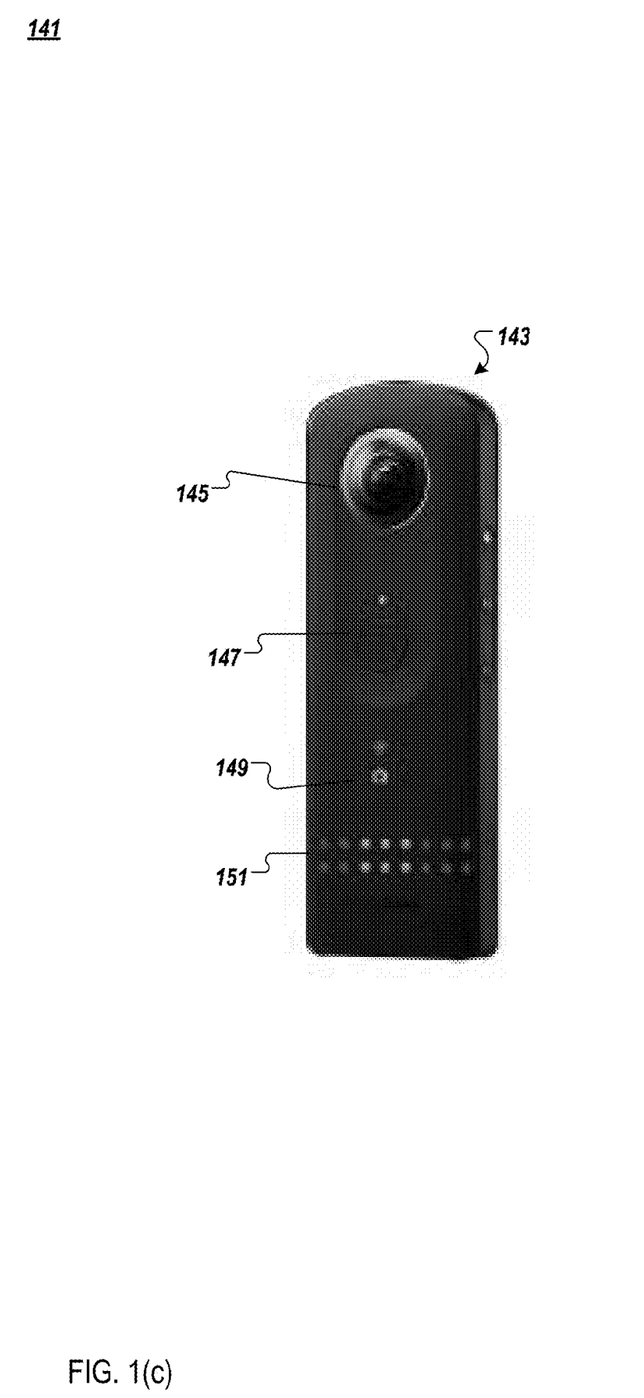

FIG. 1(c) illustrates an example implementation associated with an integrated 360 camera with lights. For example, at 141, a housing 143 is provided that includes an integral 360 camera 145, user interface 147, status indicator 149, and two rows of LED lights at 151. The number of LED lights, as well as the number of rows and the colors of the LED lights, may be modified within the inventive scope, as would be understood by those skilled in the art. This example implementation may provide a more compact structure that could be used in a location such as a smaller room or on a tabletop.

According to an example implementation that includes use of a 360 camera on a tabletop, the camera may be mounted on the example crown as described above and shown in the drawings. Further, each set of visual indicator lights of the example crown may be programmatically illuminated, to provide an indication associated with a direction to which the remote user is looking for focusing. For example, but not by way of limitation, the bottom visual indicator lights may indicate that bottled and front facing objects with respect to the 360 camera are the current focus. On the other hand, the upper ring may indicate that objects in an opposite direction, such as a face of a user or a whiteboard in the room, are the current focus.

According to another example implementation that includes a larger setting, such as a board meeting room or the like, the crown may be mounted onto the ceiling, and the 360 camera may be mounted below the crown, facing in a downward direction. As discussed above with respect to the tabletop example implementation, the LED range may be similarly employed, to indicate a viewing direction of the remote user, and a relative location of the objects that are in the focus of the 360 camera.

The example implementation described herein provide the local user associated with the 360 camera with a visual indication, such as by one or more light sources, of the one or more remote users, as well as a direction of focus for the one or more remote users. The visual indication may be provided by one or more lights, such as LEDs that do not have such a high intensity so as to interfere with the 360 camera lens. According to the above example implementation, the LED may be encased in the crown, also referred to as a base, so as to manage or limit the illumination, and provide a desired visual appearance of the light output for the local users. As a result, the local user and remote user can continue their collaboration while permitting the local user to have a privacy-preserving lighting functional associated with a direction and count of remote viewers.

While the foregoing light sources are described in association with the example implementations, the present inventive concept is not limited thereto. For example, but not by way of limitation, other programmable light sources may be substituted for the LED. According to another example implementation, an arrangement of lights, such as semi-aspherical may be provided, if flexible LCD display may be wrapped around the base, or a full flat LCD display may be used. Accordingly, the present example implementations may be designed to control a precision of the region of interest, power requirements associated with the visual indicators, and complexity of manufacture, installation, maintenance, etc.

For example but not by way of limitation, visual indicators may include, but are not limited to, an output screen (e.g., a projector generating light from one region to be projected externally, such as from the bottom to a semi-transparent cone visible from outside the projector. Alternatively, an LCD screen may be implemented (e.g., circular shaped LCD attached to the ceiling above the 360 camera, showing lights according to the example implementation as well). As a result, each user would be able to view an active viewport.

The foregoing example view may be implemented as the full 360, if a user is fully zoomed, or the user may be a zoomed in to focused area. In the example implementation where is a user is fully zoomed out, the ring would appear as a lit circle. If the user is zoomed into a viewport, such as from 45 to 15 degrees, left to right, the arc of the ring may be represented on the output display. However, the example implementation is not limited thereto, and other implementations may be substituted therefor, depending on the mapping (e.g., 1:1), tuning of the visible region (e.g., to visibly indicate the region to the people in the room), or the like.

In the example implementations, it is necessary to programmatically can control the light sources. In the present example implementation, the regions of interest in the local region of the room associated with the 360 camera may be mapped. Based on this mapping, the lights around the 360 camera may be illuminated. For example, but not by way of limitation, for a 360 camera that is ceiling mounted, the remote participants may be provided with a viewer, such as a 3-D viewer, to move the region of interest to a position of focus as they scanned the room in which the 360 camera is located. For example, the remote user may focus on a projector in the room, a participant asking a question, a marker board, or other visual point of focus, and the region of interest in the viewer can be moved accordingly, either automatically or by the remote user.

According to the example implementation, the light sources may be modeled to provide a lighting scheme. In one example implementation, the light sources are modeled and as a sensor display, and have various associated attributes, such as angular values for pitch, yaw and field of view (FoV), as well as volume.

Figure 2:
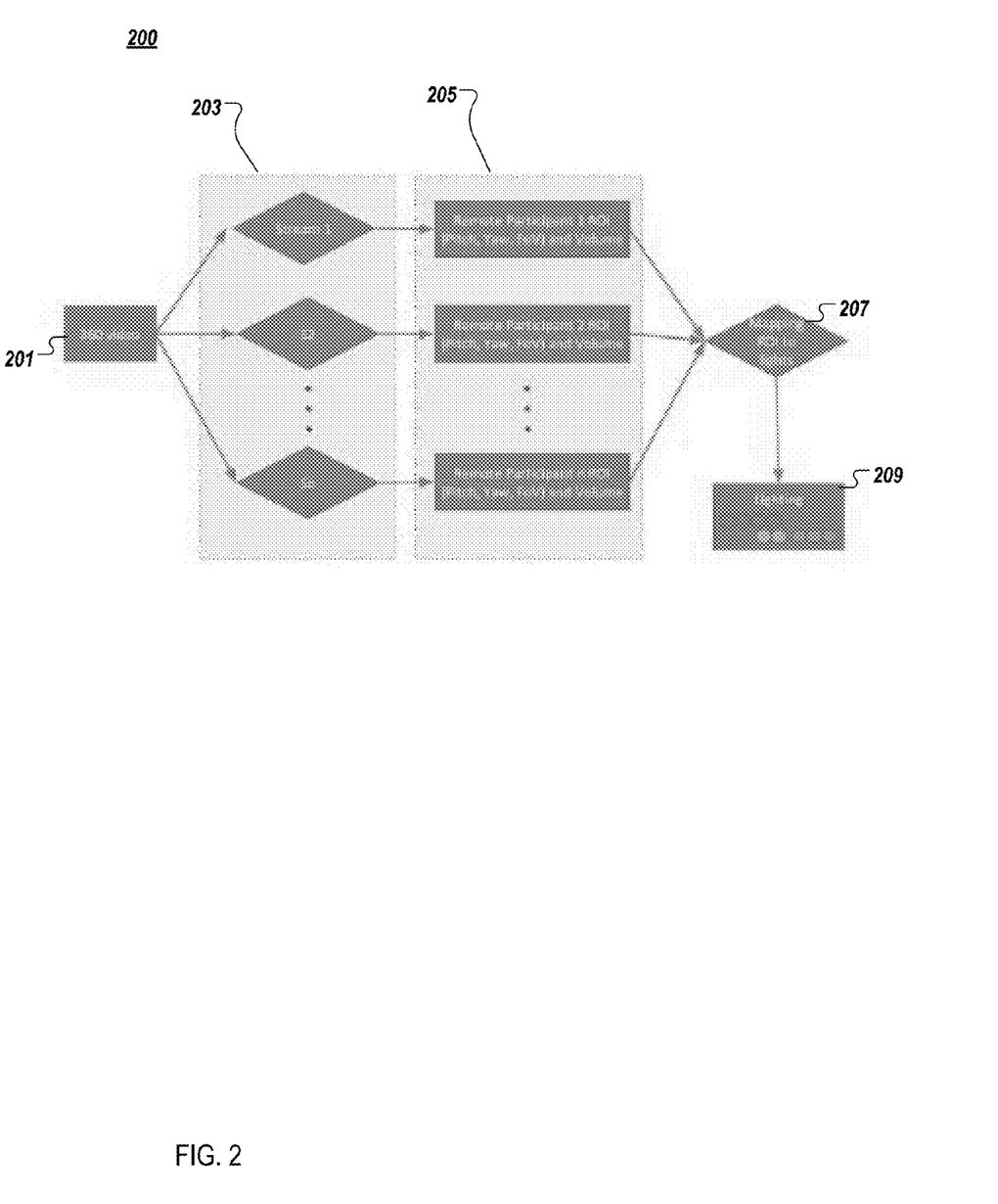
FIG. 2 illustrates a flow chart indicative of mapping of regions of interest to lighting around the 360 camera, according to an example implementation.

As shown in FIG. 2, a plurality of remote viewers may be viewing a light camera stream provided from a 360 camera in a meeting room. In the example implementation, two of the remote participants may be viewing roughly the same direction, such as a projected display in the room containing the 360 camera, perhaps showing a slideshow or the like. Another participant who is remotely viewing and output of the 360 camera may have a focus in another direction, such as the back of the room, one of the users or another portion of the room, associated optionally with a participant asking a question or providing information at their location; that participant focuses on the person.

In the forgoing example, the two participants who are focused on the same direction of the 360 camera will have similar yaw values, and a small pitch which is focused slightly downward; on the other hand the other participant will have a high pitch value, and a small field of view, as it is focused on a single user or person in that room.

Using an input of the yaw and pitch of the regions of interest for each of the remote users, the system provides programmatic control over the light sources to generate a visual output associated with these values. According to an example, non-limiting embodiment, two visual indicator lights (e.g., LED rings) are stacked on top of each other, and the foregoing example would result in the upper ring showing 2 below, to represent the positions of the respective first 2 participants who are looking at the projected display, and the lower ring is used to eliminate the direction where the third remote user is looking, which is at the participant asking the question. In the case of intermediate pitch values, both the upper ring in the lower ring may be illuminated, to provide an average of the pitch value.

While the foregoing example implementation is directed to two spatial arrangements of visual indicator lights (e.g., two LED rings), the present inventive concept is not limited thereto. Other techniques, such as semi-spherical flexible eating color display, may be employed to provide more accurate or precise visual indications of pitch and yaw values.

Accordingly, when the remote user, which may include a person or an automated tool, moves its viewport to focus on another area of the room in which the 360 camera is positioned, the pan, tilt and zoom parameters associated with such movement by the remote user may be used to modify a corresponding light and intensity output of the illumination. For example, but not by way of limitation when the remote user moves their viewport from looking at the projector screen toward looking at a participant in the back of the room based on the 360 camera, the corresponding light associated with the 360 camera moves around the crown device, and changes brightness, and the remote user zooms out.

The stacked visual indicator lights may already incorporate the yaw (e.g., 360° angles around the camera) sufficiently to provide the local participants in the room of the 360 camera with an impression of how many remote users are accessing the 360. It is noted that a viewport may provide a general region of view, but may not provide a precise or centered focus of the viewport, depending on the circumstances.

FIG. 2 illustrates an example flowchart 200 associated with the example implementations. At 201, the 360 camera receives an input. At 203, the input of the 360 camera is streamed to one or more remote users S1, S2 . . . Sn. Each of the streams is associated with a region of interest by each of the remote users or remote participants. For example, a viewport may be provided to each of the remote users.

Based on the specific region of interest of a given user, values for indication of parameters such as pitch, yaw and field of view are generated, as well as the volume. These values are output at 207 to a mapping function, which the maps the pitch, yaw and field of view associated with the region of interest, to a lighting output, as explained above.

Accordingly, at 209 when a signal is provided to the lighting at the crown by the system, the light rings are illuminated in accordance with the mapping generated at 207, which is based on the parameters received based on the remote participant region of interest at 205, which is in turn based on the respective stream received at 203 from the 360 camera at 201.

Figure 3:
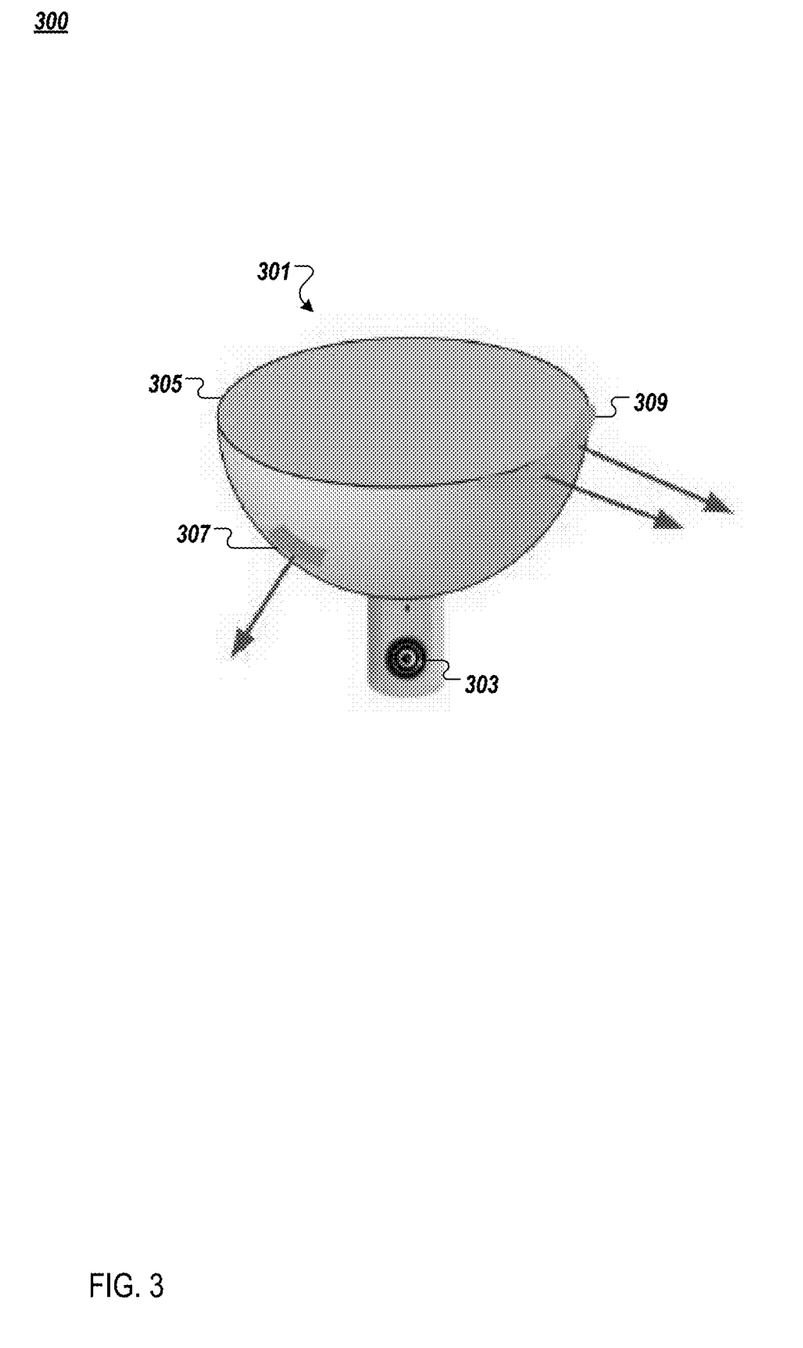
FIG. 3 illustrates modeling of the regions of interest on a 360 camera, according to an example implementation.

FIG. 3 illustrates an example output based on a mapping according to the example implementation. At 300, an apparatus 301 is provided that includes a 360 camera 303 as well as a crown 305 that includes one or more light rings.

In the forgoing example, two remote viewers are looking straight ahead with respect to the 360 camera, and they are working in the same direction at with respect to one another. On the other hand, the third participant is looking downward, in a different direction from the first two remote users. Based on the above explained mapping, a visual output is provided at 309, which is at an upper region of the crown 305. This visual output, which is a first color, in this case orange, is twice as long as the visual output provided at 307, because there are two remote viewers looking in the direction of 309, as compared with one remote user looking in the direction of 307.

Further, the visual output at 309 is higher on the crown as compared with the visual output at 307, because the remote viewers are focused at a position that is higher up in the room, such as a projection screen, as opposed to the third user, who is focused on a position that is lower in the room, such as a person sitting at their desk. Further, because the field of view of the projector screen is wider than the narrow field of view of the person sitting at their desk, a smaller number of life are illuminated at 307 as compared with 309, based on the field of view of each of the remote users, based on information acquired as explained above (e.g., by their viewports).

According to another example implementation, remote users who are viewing a meeting by way of the 360 camera might be large in number. In such a situation, it may be relatively difficult to accurately represent an actual number of viewers were remotely working in a given direction in a manner explained above. As an alternate approach, light power (e.g., strength or brightness) may be used to provide an indication of a number of users. For example but not by way of limitation, where there are more remote users having similar yaw and pitch angles, a brighter color may be emitted by the visual indicator lights. Further, for a situation when one or more remote users connects or disconnects from the 360 camera, thus indicating that a user is joining or leading a meeting, special lighting effects may be provided.

Additionally, according to another example implementation, one or more of the local participants may wish to be made aware of a status or identity of a specific remote user. According to one example, a company's Chief Executive Officer (CEO) may be a remote user, as well as one or more other remote users to a meeting. In this circumstance, the local participants in the room with the 360 camera may wish to be aware of the light source that is associated with the remote activity of the CEO.

To accommodate foregoing situation, bidirectional audio may be provided such that the CEO may introduce themselves at the time of connection, or other type. Further, reserve action effects could be employed such that the local participants may know that a specific light is associated with the CEO as the remote user. For example but not by way of limitation, certain users may have reserved colors, either based on their user identification or credentials.

According to another example implementation, the remote user may be locked onto a specific viewport. According to this example implementation, a local presenter or a remote presenter may be able to require every remote user, to focus their remote view only on a certain region of interest. For example, a local presenter may wish to force all remote participants to have their region of interest and the slides that are being presented. Thus, the local presenter may lock the remote viewers on the viewport associated with the projector. When this locking function is performed, the lights associated with the 360 camera may output a visualization, such as an animation that moves all the lights to align 4.2 the projector, such as the local participants can be made aware that all of the remote users are now locked in that direction.

As noted above, the remote users may be agents, such as automatic surveillance systems for home automation agents. These agents may also be visually represented by the lights associated with the 360 camera, such as using a specific color, to differentiate the agents from other remote users associated with persons. For these agents, particularly those that use artificial intelligence, a multi-direct microphone array, also referred to as a "3D mic", may be used to determine where somebody is currently speaking locally in the room associated with the 360 camera. Accordingly, lights on the 360 camera may be eliminated to indicate that the AI—based agent is remotely sensing via the 360 camera, so that the local users will be aware of the focus of the agent.

Management and control of the foregoing example implementation, such as the control of the lighting, mapping, user settings or the like may be controlled by one or more approaches, including but not limited to web user experience, mobile online application, text based communication service channel, as well as voice command. The system may be interactive (e.g., bot and/or voice-activated system).

The 360 camera and the associated light sources may provide special signals for turning off or turning on, as well as audio effects. For example, but not by way of limitation, a website may be employed, such that the colors associated with the commands can be controlled. Similarly, other aspects of the light output by the light apparatus may be controlled.

Figure 4:
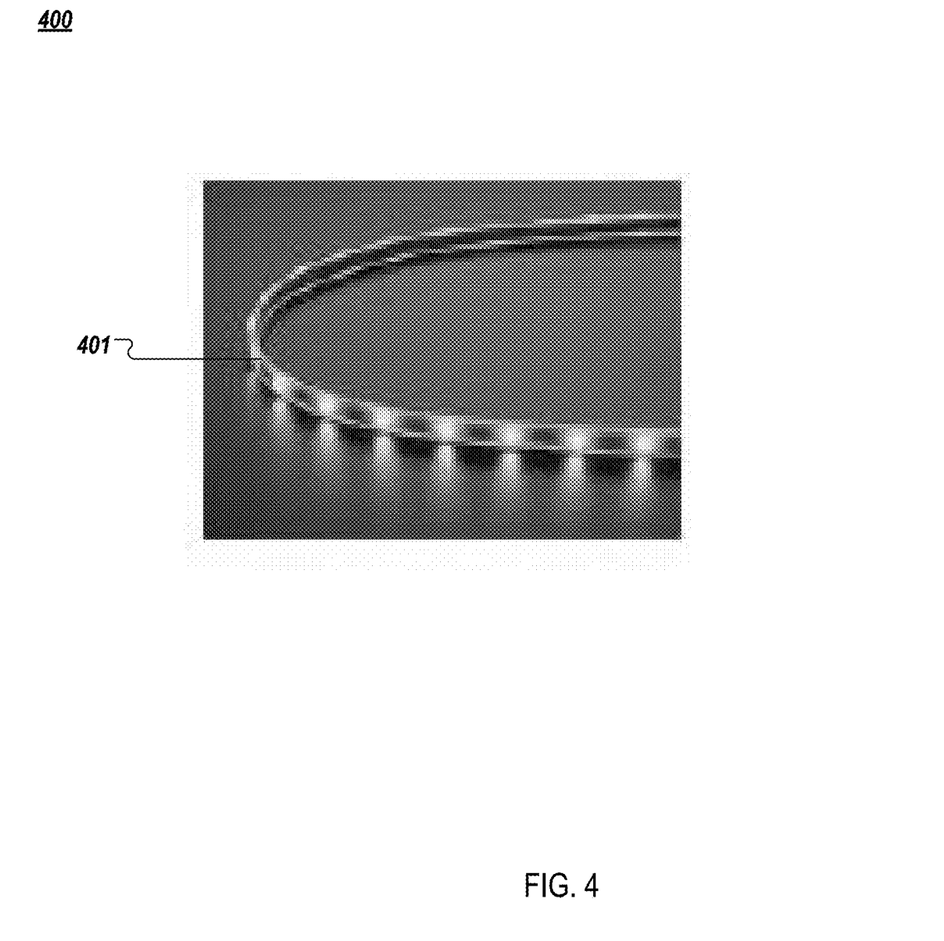
FIG. 4 illustrates a mechanism associated with the lighting on the 360 camera, according to an example implementation.

According to one implementation of the forgoing example, a base was constructed using LED strips 401, such as those shown in FIG. 4 at 400, stacked on top of one another and enclosed inside a 3-D printing, semi-transparent base. A 360 camera was then mounted on top of that structure. The LEDs enclosed in the base did not adversely impact the performance of the 360 camera, and thus the collaboration event could continue without disruption. This apparatus was deployed in a meeting room, and a 360 video viewer was provided to remote users, such that yaw, pitch and field-of-view values were received from the remote users. The LED rings were controlled, and connected to a server.

Figure 5:
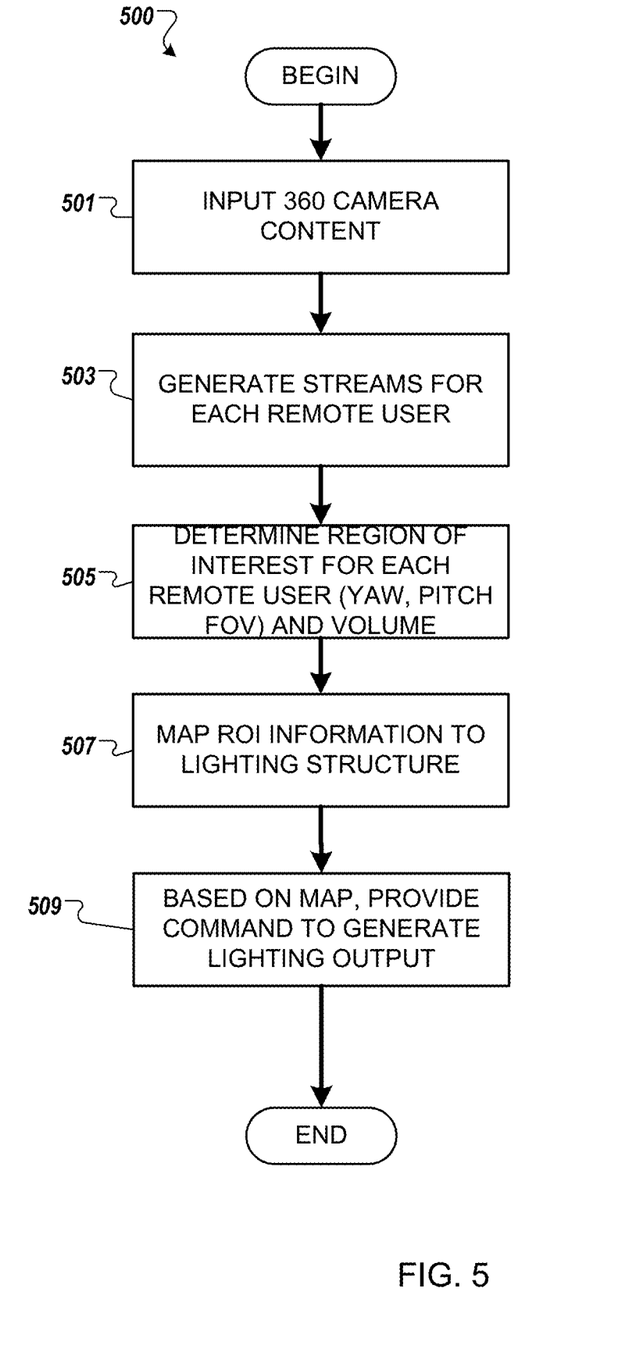
FIG. 5 illustrates a method in accordance with the example implementations.

FIG. 5 illustrates an example process 500 according to the example implementations. At 501, an input is received from the 360 camera. For example, this input may be associated with the information received via the 360 camera of the local environment in all directions at all times.

At 503, a stream is generated for each remote user. The remote users may include, but are not limited to, remote users associated with persons, and agents, as explained above. Each of the remote users may interact with the 360 camera via a device, such as a viewport.

At 505, based on the stream and the information from the device of the remote user, region of interest information and volume information is determined. For example, the pitch, yaw, and field-of-view may be determined. Further, information associated with the remote user, such as whether the remote user is a person or an agent, and if the remote user is a person, whether the remote user is a person having a specific credential or other identity indicator such as title (e.g., CEO), may also be generated or determined at 505.

At 507, a mapping function is performed, which takes the information obtained or determined at 505, and maps that information to the particular light structure of the specific lighting configuration associated with the 360 camera. At different 360 camera may have different lighting configurations and functions, different mappings may be made available, so that the system may be used with a multitude of 360 camera arrangements.

Based on the mapping performed in 507, a command may be generated and provided to the lighting at 509. Based on the command, a light output is generated that is indicative of the region of interest information associated with the remote user, such that the local user in the room with the 360 camera is made aware of activity of the remote user, such as number of remote viewers, direction of viewing of each of the remote viewers, etc. as explained above.

Figure 6:
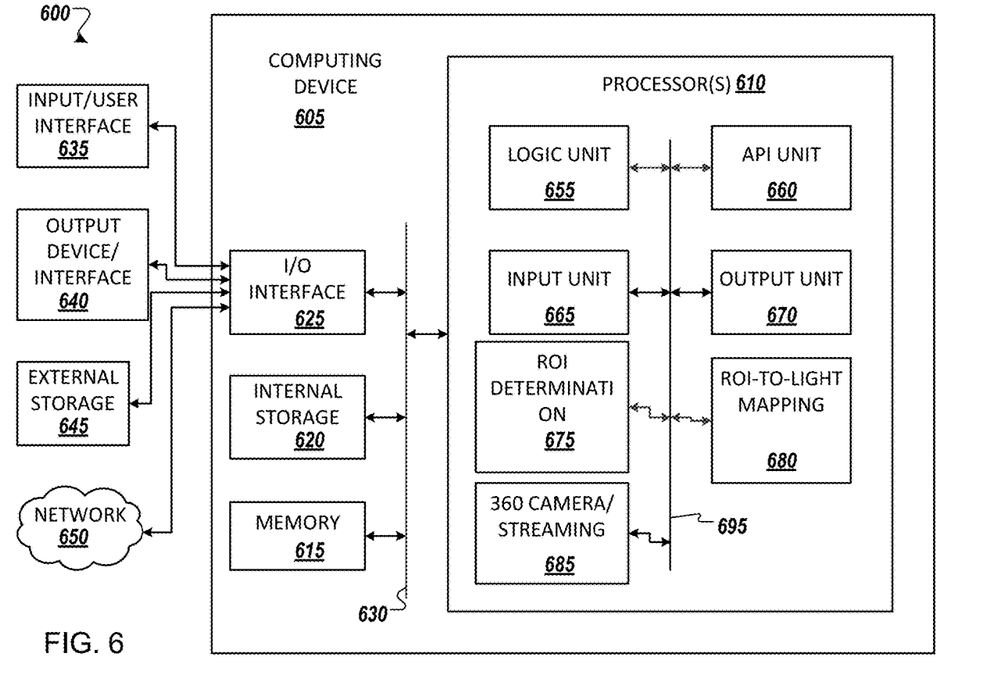
FIG. 6 illustrates an example computing environment with an example computer device suitable for use in some example implementations.

FIG. 6 illustrates an example computing environment 600 with an example computer device 605 suitable for use in some example implementations. Computing device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computing device 605.

Computing device 605 can be communicatively coupled to input/interface 635 and output device/interface 640. Either one or both of input/interface 635 and output device/interface 640 can be a wired or wireless interface and can be detachable. Input/interface 635 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 640 may include a display, television, monitor, printer, speaker, braille, or the like. In some example implementations, input/interface 635 (e.g., user interface) and output device/interface 640 can be embedded with, or physically coupled to, the computing device 605. In other example implementations, other computing devices may function as, or provide the functions of, an input/interface 635 and output device/interface 640 for a computing device 605. These elements may include, but are not limited to, well-known AR hardware inputs so as to permit a user to interact with an AR environment.

Examples of computing device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 605 can be communicatively coupled (e.g., via I/O interface 625) to external storage 645 and network 650 for communicating with any number of networked components, devices, and systems, including one or more computing devices of the same or different configuration. Computing device 605 or any connected computing device can be functioning as, providing services of, or referred to as, a server, client, thin server, general machine, special-purpose machine, or another label.

I/O interface 625 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computing device 605 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. One or more applications can be deployed that include logic unit 655, application programming interface (API) unit 660, input unit 665, output unit 670, ROI determination 675, ROI to light mapping 680, 360 camera/streaming 685, and inter-unit communication mechanism 695 for the different units to communicate with each other, with the OS, and with other applications (not shown).

For example, the ROI determination 675, the ROI to light mapping 680, and the 360 camera/streaming 685 may implement one or more processes shown in FIGS. 2 and 5 with respect to the structures shown in FIGS. 1(a)-1(c), 3 and 4. The described units and elements can be varied in design, function, configuration, or implementation and are not limited to the descriptions provided.

In some example implementations, when information or an execution instruction is received by API unit 660, it may be communicated to one or more other units (e.g., logic unit 655, input unit 665, ROI determination 675, ROI to light mapping 680, and 360 camera/streaming 685). For example, the ROI determination 675 may identify inputs from the streams received from the 360 camera, and determine a region of interest, as well as pitch, yaw and field of view information, as explained above. The ROI to light mapping 680 may perform matching between the ROI information and lighting system associated with the 360 camera, to provide a command signal such that the lights illuminate based on the ROI information. Additionally, the 360 camera/streaming 685 may provide streams to the remote users.

In some instances, the logic unit 655 may be configured to control the information flow among the units and direct the services provided by API unit 660, input unit 665, ROI determination 675, ROI to light mapping 680, and 360 camera/streaming 685 in some example implementations described above. For example, the flow of one or more processes or implementations may be controlled by logic unit 655 alone or in conjunction with API unit 660.

Figure 7:
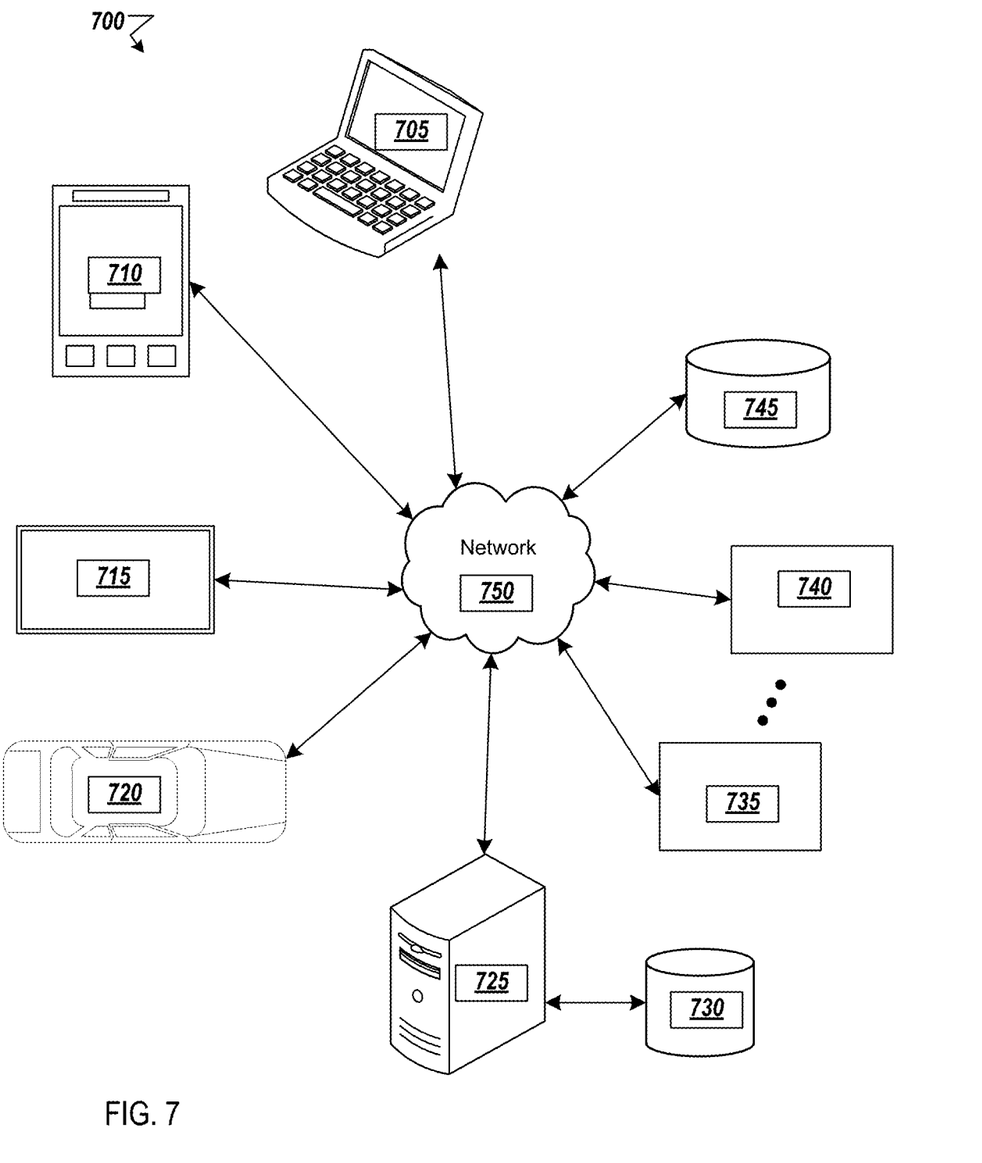
FIG. 7 shows an example environment suitable for some example implementations.

FIG. 7 shows an example environment suitable for some example implementations. Environment 700 includes devices 705-745, and each is communicatively connected to at least one other device via, for example, network 760 (e.g., by wired and/or wireless connections). Some devices may be communicatively connected to one or more storage devices 730 and 745.

An example of one or more devices 705-745 may be computing devices 605 described in FIG. 6, respectively. Devices 705-745 may include, but are not limited to, a computer 705 (e.g., a laptop computing device) having a monitor and an associated webcam as explained above, a mobile device 710 (e.g., smartphone or tablet), a television 715, a device associated with a vehicle 720, a server computer 725, computing devices 735-740, storage devices 730 and 745.

The devices may be communicatively connected, including but not limited to AR peripherals that are well known in the art to permit a user to interact in AR, VR, mixed reality, or other environments. Further, the devices may include media object capture hardware, as would be understood by those skilled in the art.

In some implementations, devices 705-720 may be considered user devices associated with the users of the enterprise. Devices 725-745 may be devices associated with service providers (e.g., used by the external host to provide services as described above and with respect to the various drawings, and/or store data, such as webpages, text, text portions, images, image portions, audios, audio segments, videos, video segments, and/or information thereabout).

The foregoing example implementations may have various benefits and advantages over the related art. For example, but not by way of limitation, while related art 360 cameras may provide functional lights, the related art approaches do not provide local users with any indication of a direction or counts of remote users, whether they be persons or agents. Accordingly, the present example implementations provide users with such visual indications of a direction, count or even an identity of the remote user. Further, it is noted that the visual indications may be, instead of an LED rain, icons or the like.

Similarly, participants in a local meeting may be provided with enhanced opportunity for privacy protection, as well as gaze and awareness between the local participants and the remote participants, to provide for potentially improved collaboration. For example, privacy may be enhanced as the system distinguishes between artificial and human remote users, for example by flag or other means.

According to another example implementation, a desktop version may be provided, such that a user at his or her desktop may employ a 360 camera to communicate with another user, or a plurality of other users, in the manner noted above.

According to still another example implementation, the forgoing features may be integrated into a virtual reality were augmented reality system. For example, the device used by the remote user to view the 360 camera may be a VR/AR viewer such that the remote user is able to experience being in the meeting, from the perspective of the location of the 360 camera, such as at the ceiling of the room. It is also noted that the foregoing system may be used for live streaming, two-way communication whether in the context of a VR, AR viewer, or otherwise.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. An apparatus, comprising:
a 360 camera configured to image a volume including one or more local users, and generate an output for remote users, wherein the remote users comprise an automated agent and a person; and
an illumination device configured to generate a visual output for the one or more local users that is indicative of a viewing direction or a number of the remote users, and a type of the remote user being the person or the automated agent, based on a mapping of a region of interest of the remote viewers, and
wherein the illumination device is associated with the 360 camera.

2. The apparatus of claim 1, wherein the automated agent comprises an automatic surveillance system for a home automation agent, and the illumination device distinguishes between the automated agent and the person based on a flag.

3. The apparatus of claim 1, wherein the mapping of the region of interest of the remote viewers comprises, for each of the remote users, yaw, pitch and field of view values that are mapped to the illumination device.

4. The apparatus of claim 1, wherein the illumination device comprises a stack of visual indicator lights.

5. The apparatus of claim 4, wherein the stack of visual indicator lights is embedded in a crown that is configured to receive the 360 camera.

6. The apparatus of claim 1, wherein the visual output comprises at least one of a size, color and intensity of the illumination device that is indicative of the viewing direction or the number of the remote users, or of one or more of the remote users joining, leaving, speaking and synchronizing to a viewport determining by the one or more local users.

7. The apparatus of claim 1, wherein a motion of the remote users is represented by a motion and a brightness of the illumination device around the 360 camera that corresponds to the motion.

8. The apparatus of claim 7, wherein the motion of the remote user comprises one or more of pan, tilt and zoom.

9. A method, comprising:
receiving an input from a 360 camera, wherein the input is associated with information received via the 360 camera of a local environment;
generating a stream is generated for each of plural remote users that each interact with the 360 camera via a device, wherein the remote users comprise an automated agent and a person;
based on the stream and information from the device of the remote user for each of the remote users, determining region of interest information;
mapping the determined region of interest information to the particular light structure of a specific lighting configuration associated with the 360 camera;
generating a command and providing the command to the lighting; and
based on the command, generating a light output indicative of the region of interest information associated with the remote users, and a type of the remote user being the person or the automated agent, such that a local user at or near the 360 camera may view the light output.

10. The method of claim 9, wherein the automated agent comprises an automatic surveillance system for a home automation agent, and the illumination device distinguishes between the automated agent and the person based on a flag.

11. The method of claim 9, wherein the mapping of the region of interest of the remote viewers comprises, for each of the remote users, yaw, pitch and field of view values that are mapped to the illumination device.

12. The method of claim 9, wherein the illumination device comprises a stack of visual indicator lights, and the stack of visual indicator lights is embedded in a crown that is configured to receive the 360 camera.

13. The method of claim 9, wherein the visual output comprises at least one of a size, color and intensity of the illumination device that is indicative of the viewing direction or the number of the remote users, or of one or more of the remote users joining, leaving, speaking and synchronizing to a viewport determining by the one or more local users.

14. The method of claim 9, wherein a motion of the remote users is represented by a motion and a brightness of the illumination device around the 360 camera that corresponds to the motion, and the motion of the remote user comprises one or more of pan, tilt and zoom.

15. A non-transitory computer readable medium including a processor configured to execute instructions stored in a storage, the instructions comprising:
generating a stream is generated for each of plural remote users that each interact, via a device, with a 360 camera that provides information associated with a local environment, wherein the remote users comprise an automated agent and a person;
based on the stream and information from the device of the remote user for each of the remote users, determining region of interest information;
mapping the determined region of interest information to the particular light structure of a specific lighting configuration associated with the 360 camera; and
generating a command to output a light display indicative of the region of interest information associated with the remote users, and a type of the remote user being the person or the automated agent, such that a local user at or near the 360 camera may view the light output.

16. The non-transitory computer readable medium of claim 15, wherein the automated agent comprises an automatic surveillance system for a home automation agent, and the illumination device distinguishes between the automated agent and the person based on a flag.

17. The non-transitory computer readable medium of claim 15, wherein the mapping of the region of interest of the remote viewers comprises, for each of the remote users, yaw, pitch and field of view values that are mapped to the illumination device.

18. The non-transitory computer readable medium of claim 15, wherein the illumination device comprises a stack of visual indicator lights, and the stack of visual indicator lights is embedded in a crown that is configured to receive the 360 camera.

19. The non-transitory computer readable medium of claim 15, wherein the visual output comprises at least one of a size, color and intensity of the illumination device that is indicative of the viewing direction or the number of the remote users, or of one or more of the remote users joining, leaving, speaking and synchronizing to a viewport determining by the one or more local users.

20. The non-transitory computer readable medium of claim 15, wherein a motion of the remote users is represented by a motion and a brightness of the illumination device around the 360 camera that corresponds to the motion, and the motion of the remote user comprises one or more of pan, tilt and zoom.

* * * * *